US011977638B2

(12) United States Patent
Kannan et al.

(10) Patent No.: US 11,977,638 B2
(45) Date of Patent: May 7, 2024

(54) LOW-IMPACT FIRMWARE UPDATE (71) Applicant: Ampere Computing LLC, Santa Clara, CA (US)

(72) Inventors: Sachhidh Kannan, Portland, OR (US); Shivnandan Kaushik, Portland, OR (US); Harb Abdulhamid, Raleigh, NC (US); Yogesh Bansal, Beaverton, OR (US); Vanshidhar Konda, Portland, OR (US)

(73) Assignee: Ampere Computing LLC, Santa Clara, CA (US)

( * ) Notice: Subject to any disclaimer, the term of this patent is extended or adjusted under 35 U.S.C. 154(b) by 129 days.

(21) Appl. No.: 17/809,888

(22) Filed: Jun. 29, 2022

(65) Prior Publication Data

US 2024/0005003 A1 Jan. 4, 2024

(51) Int. Cl.
*G06F 21/57* (2013.01)
*G06F 8/65* (2018.01)
*G06F 8/656* (2018.01)

(52) U.S. Cl.
CPC .............. *G06F 21/572* (2013.01); *G06F 8/65* (2013.01); *G06F 8/656* (2018.02)

(58) Field of Classification Search
CPC ........... G06F 21/572; G06F 8/65; G06F 8/656
See application file for complete search history.

(56) References Cited

U.S. PATENT DOCUMENTS

| | | | | |
|---|---|---|---|---|
| 9,930,051 B1* | 3/2018 | Potlapally | ............. | H04L 63/126 |
| 2014/0068594 A1* | 3/2014 | Young | ........................ | G06F 8/65 |
| | | | | 717/172 |
| 2018/0048473 A1* | 2/2018 | Miller | ........................ | H04L 9/30 |
| 2018/0145991 A1* | 5/2018 | McCauley | ............ | H04L 9/0891 |
| 2019/0042752 A1* | 2/2019 | Mihm | .................... | G06F 21/575 |
| 2019/0325139 A1* | 10/2019 | Dewan | .................. | H04L 41/082 |
| 2020/0257518 A1* | 8/2020 | Liedtke | ................. | G06F 21/572 |
| 2021/0240489 A1* | 8/2021 | Xie | ........................ | G06F 21/572 |
| 2023/0297680 A1* | 9/2023 | Bose | ....................... | G06F 21/572 |
| | | | | 726/22 |
| 2023/0305833 A1* | 9/2023 | Zhang | ................... | G06F 9/4418 |

\* cited by examiner

*Primary Examiner* — Glenn A. Auve
(74) *Attorney, Agent, or Firm* — Muncy, Geissler, Olds & Lowe, P.C.

(57) ABSTRACT

Disclosed are techniques for performing a low-impact firmware update to a first microcontroller. In an aspect, a security entity communicatively coupled to the first microcontroller receives an update to firmware of the first microcontroller, authenticates the update to the firmware of the first microcontroller to prevent a security-related rollback, offloads system management tasks and interrupt handling from the first microcontroller to at least a second microcontroller communicatively coupled to the first microcontroller, coordinates installation of the update to the firmware of the first microcontroller without taking processing cycles from host software, and restores, to the first microcontroller, system management states occurring after the system management tasks and interrupt handling are offloaded from the first microcontroller.

20 Claims, 4 Drawing Sheets

LOW-IMPACT FIRMWARE UPDATE

BACKGROUND OF THE DISCLOSURE

1. Field of the Disclosure

Aspects of the disclosure relate generally to firmware updates, and specifically to a low-impact firmware updates on a multi-core system-on-chip ("SoC").

2. Description of the Related Art

Multi-core systems are a convenient way to provide scalable processing power to customers that need a certain processing capability on which to run a customer-visible operating environment, such as a customer-visible operating system (OS) and applications, which may be referred to herein as customer processes or client processes. For example, a cloud services provider (CSP) may lease a core (or multiple cores) to a customer, and the customer presumes that the customer has exclusive use of the core or cores. However, multi-core systems conventionally devote some amount of processing cycles of those core(s) for system management functions that are separate from the customer processes running on the cores, and so some of the processing capability of the customer core may occasionally be used to execute tasks that are related to management of the multi-core system or SoC.

In the datacenter space, uptime is critical, as CSPs seek to minimize any downtime of their systems, particularly where such downtime affects customer or client processes. Typically, updating the firmware of a microcontroller on a multi-core SoC requires a system reboot, which results in at least a temporary disruption (loss) of service to customers. That disruption may be several minutes long, which is a significant amount of downtime for a datacenter. This results in firmware updates being a very risky and expensive process. Accordingly, there is a need to be able to update specific pieces of firmware without disrupting service.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of performing a low-impact firmware update to a first microcontroller includes receiving, at a security entity communicatively coupled to the first microcontroller, an update to firmware of the first microcontroller; authenticating, by the security entity, the update to the firmware of the first microcontroller to prevent a security-related rollback; offloading, by the security entity, system management tasks and interrupt handling from the first microcontroller to at least a second microcontroller communicatively coupled to the first microcontroller; coordinating, by the security entity, installation of the update to the firmware of the first microcontroller without taking processing cycles from host software; and restoring, to the first microcontroller by the security entity, system management states occurring after the system management tasks and interrupt handling are offloaded from the first microcontroller.

In an aspect, an apparatus includes a memory; a first microcontroller; and a security entity communicatively coupled to the first microcontroller, wherein the security entity is configured to: receive an update to firmware of the first microcontroller; authenticate the update to the firmware of the first microcontroller to prevent a security-related rollback; offload system management tasks and interrupt handling from the first microcontroller to at least a second microcontroller communicatively coupled to the first microcontroller; coordinate installation of the update to the firmware of the first microcontroller without taking processing cycles from host software of the apparatus; and restore, to the first microcontroller, system management states occurring after the system management tasks and interrupt handling are offloaded from the first microcontroller.

In an aspect, an apparatus includes means for receiving an update to firmware of a first microcontroller; means for authenticating the update to the firmware of the first microcontroller to prevent a security-related rollback; means for offloading system management tasks and interrupt handling from the first microcontroller to at least a second microcontroller on the apparatus; means for coordinating installation of the update to the firmware of the first microcontroller without taking processing cycles from host software of the apparatus; and means for restoring, to the first microcontroller, system management states occurring after the system management tasks and interrupt handling are offloaded from the first microcontroller.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

The present disclosure provides techniques to perform a low-impact update to the firmware of a microcontroller on a system on a chip (SoC). During a low-impact update, critical functionality performed by that microcontroller is temporarily offloaded or paused during the update. A low-impact update can be performed fast enough (e.g., within a few microseconds) to avoid any observable disruption in service.

Figure 1:
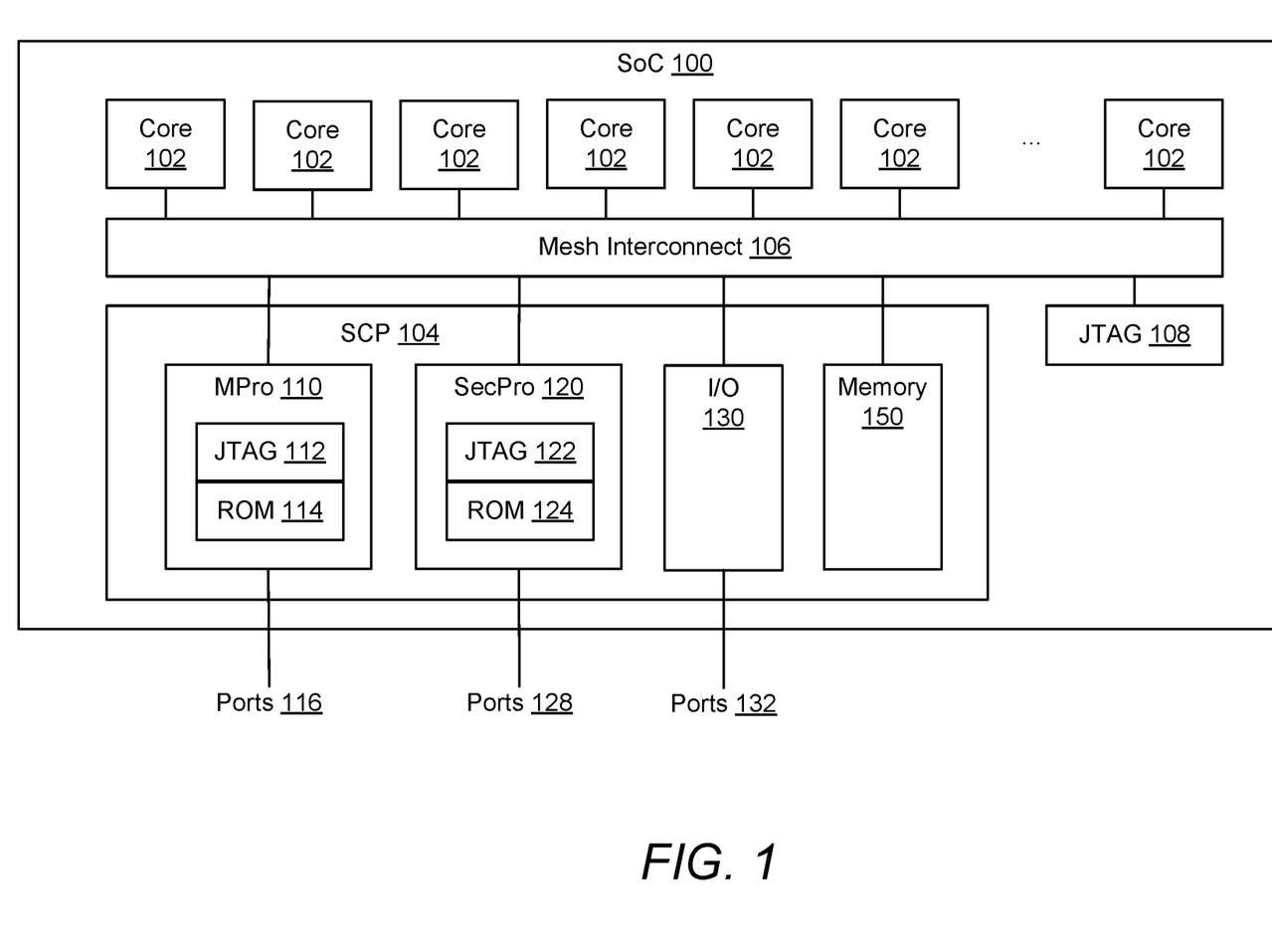
FIG. 1 is a diagram of an example system on a chip (SoC), according to aspects of the disclosure.

FIG. 1 is a diagram of an example SoC 100, according to aspects of the disclosure. The SoC 100 illustrated in FIG. 1 includes a set of processing cores 102 (or simply "cores" 102) and a system control processor (SCP) 104 that handles many of the system management functions of the SoC 100.

As will be appreciated, the SoC 100 may include more or less than the illustrated number of cores 102 (e.g., 50 cores 102, 80 cores 102, or 120+ cores 102).

The cores 102 are connected (communicatively coupled) to the SCP 104 via a mesh interconnect 106 that forms a high-speed data bus connecting each core 102 to the other cores 102 and to other on-chip and off-chip resources, including higher levels of memory (e.g., a level three (L3) cache, dual data rate ("DDR") memory), peripheral component interconnect express (PCIe) interfaces, and/or other resources. The SCP 104 may include a variety of system management functions, which may be divided across multiple functional blocks or which may be a single functional block. In the example of FIG. 1, the system management functions of the SCP 104 are divided over a management processor (MPro) 110 and a security processor (SecPro) 120 connected to (communicatively coupled to) other components of the SoC 100 by the mesh interconnect 106. The MPro 110 and the SecPro 120 include MPro joint test action group (JTAG) ports and firmware 112 and SecPro JTAG ports and firmware 122, respectively. The mesh interconnect 106, an inter-integrated circuit (I2C) interface, or other connections may connect the components of the SoC 100 to SoC JTAG ports and firmware 108, the MPro JTAG ports and firmware 112, and the SecPro JTAG ports and firmware 122. The SCP 104 further includes an input/output (I/O) block 130 and an on-board shared memory 150 also connected to (communicatively coupled) other components of the SoC 100 by the mesh interconnect 106. Note that although FIG. 1 illustrates the MPro 110 and the SecPro 120 as separate microcontrollers (or processors), as will be appreciated, they may be combined into one microcontroller or sub-divided into more than two microcontrollers.

The MPro 110 and the SecPro 120 may include a boot-strap controller and an I2C controller or other bus controller. The MPro 110 and the SecPro 120 may communicate with on-chip sensors, an off-chip baseboard management controller (BMC), and/or other external systems to provide control signals to external systems. The MPro 110 and the SecPro 120 may connect to one or more off-chip systems as well via ports 116 and 128, respectively, and/or may connect to off-chip systems via the I/O block 130.

The MPro 110 performs error handling and crash recovery for the cores 102 of the SoC 100 and performs power failure detection, recovery, and other fail safes for the SoC 100. The MPro 110 performs the power management for the SoC 100 and may connect to one or more voltage regulators (VR) that provide power to the SoC 100. The MPro 110 may receive voltage readings, power readings, and/or thermal readings and may generate control signals (e.g., dynamic voltage and frequency scaling (DVFS) to be sent to the voltage regulators. The MPro 110 may also report power conditions and throttling to an operating system (OS) or hypervisor running on the SoC 100. The MPro 110 may provide the power for boot up and may have specific power throttling and specific power connections for boot power to the SCP 104 and/or the SecPro 120. The MPro 110 may receive power or control signals, voltage ramp signals, and other power control from other components of the SCP 104, such as the SecPro 120, during boot up as hardware and firmware become activated on the SoC 100. These power-up processes and power sequencing may be automatic or may be linked to events occurring at or detected by the MPro 110 and/or the SecPro 120. The MPro 110 may connect to the shared memory 150, the SecPro 120, and external systems (e.g., VRs) via ports 114, and may supply power to each via power lines.

The SecPro 120 manages the boot process and may include on-board read-only memory (ROM) 114 (or erasable programmable ROM (EPROM)) for safely storing firmware for controlling and performing the boot process. The SecPro 120 also performs security sensitive operations and only runs authenticated firmware. More specifically, the components of the SoC 100 may be divided into trusted components and non-trusted components, where the trusted components may be verified by certificates in the case of software and firmware components, or may be pure hardware components, so that at boot time, the SecPro 120 may ensure that the boot process is secure. The SecPro 120 may include on-board ROM 124 (or EPROM).

The shared memory 150 may be on-board random-access memory (RAM) or secured RAM that can be trusted by the SecPro 120 after an integrity check or certificate check. The I/O block 130 may connect over ports 132 to external systems and memory (not shown) and connect to the shared memory 150. The SCP 104 may use the I/O connections of the I/O block 130 to interface with a BMC or other management system(s) for the SoC 100 and/or to the network of the cloud platform (e.g., via gigabit ethernet, PCIe, or fiber). The SCP 104 may perform scaling, balancing, throttling, and other control processes to manage the cores 102, associated memory controllers, and mesh interconnect 106 of the SoC 100.

A BMC is a specialized service processor that monitors the physical state of the SoC 100 using sensors and communicates with the system administrator through an independent connection. The sensors of the BMC measure internal physical variables such as temperature, humidity, power-supply voltage, fan speeds, communications parameters, and OS functions. The BMC is part of the intelligent platform management interface (IPMI) and is usually contained in the motherboard or main circuit board of the device (SoC 100) to be monitored.

In the datacenter space, uptime is critical—cloud service providers (CSPs) seek to minimize any downtime of their systems, particularly where such downtime affects customer or client processes. Typically, updating the firmware of a microcontroller on a multi-core SoC requires a system reboot, which results in at least a temporary disruption (loss) of service to customers. That disruption may be several minutes long, which is a significant amount of downtime for a datacenter. This results in firmware updates being a very risky and expensive process. As such, CSPs would prefer to be able to update specific pieces of firmware without needing to disrupt the service to their customers. This can be done currently for high-level software, such as kernel code, but not firmware.

The present disclosure provides techniques to perform a low-impact update to firmware. A low-impact update is a targeted reboot of a specific microcontroller (e.g., MPro 110) in the SoC (e.g., SoC 100), while simultaneously temporarily offloading or pausing critical functionality performed by that microcontroller (or processor). A low-impact update can be performed fast enough (e.g., within a few microseconds) to avoid any customer-observable disruption in service. Thus, the present techniques can provide CSPs with the ability to perform frequent firmware updates without causing a loss of service to their customers. These updates may be to fix software "bugs," address security issues, add new features to the SoC in a firmware update, and the like.

Figure 2:
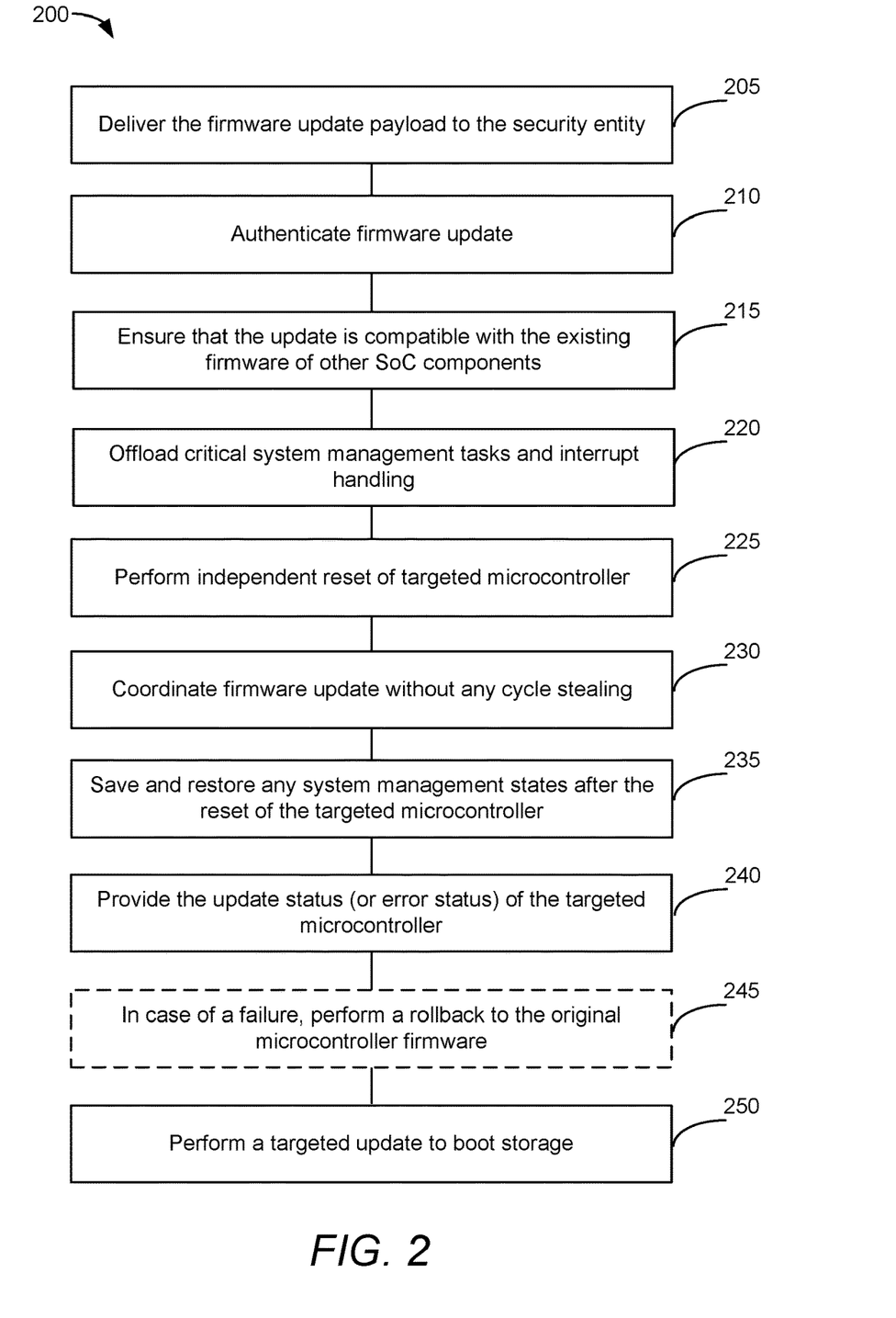
FIG. 2 illustrates an example flow for performing a low-impact firmware update, according to aspects of the disclosure.

FIG. 2 illustrates an example flow 200 for performing a low-impact firmware update, according to aspects of the disclosure. The flow 200 may be performed to update the firmware on a particular microcontroller, such as the MPro 110 on the SoC 100. The flow 200 may leverage a security entity (e.g., SecPro 120) to authenticate the targeted microcontroller's firmware and facilitate the update. The security entity may be any processor or microprocessor that performs security sensitive operations and only runs authenticated firmware.

At stage 205, the firmware update payload is delivered to the security entity (e.g., SecPro 120) using in-band firmware update delivery or out-of-band firmware update delivery. The OS associated with the SoC is not aware of the firmware update being delivered. The in-band firmware delivery may utilize Unified Extensible Firmware Interface (UEFI) Management Mode (MM)/System Management Mode (SMM). The out-of-band firmware update delivery may utilize the BMC.

At stage 210, the update to the targeted microcontroller's firmware is authenticated to prevent security-related rollbacks. For example, the update may be associated with a certificate that the security entity can authenticate. This stage can be performed fast enough to avoid any disruption of service.

At stage 215, the update is ensured to be compatible with the existing firmware pieces of the other components of the SoC. This stage may be performed by the security entity.

At stage 220, critical system management tasks (e.g., tasks related to reliability, availability, and serviceability (RAS), power management, thermal management, etc.) and interrupt handling are offloaded from the targeted microcontroller (e.g., MPro 110) to one or more different processors or microcontrollers on the SoC, such as the security entity. This stage does not cause a noticeable impact to the services provided by the targeted microcontroller, as these services are simply moved from one microcontroller to another. Also during this stage, non-critical services provided by the targeted microcontroller may be paused instead of offloaded.

At stage 225, an independent reset (e.g., cycling the power) of the targeted microcontroller is performed without perturbing (e.g., without cycling the power of) other components of the SoC (e.g., SoC 100). The independent reset may be triggered by, for example, the security entity or some other component of the SCP 104. This puts the targeted microcontroller in an isolated reset domain to enable reboot (e.g., cycling the power and returning to a usable state) of the microcontroller without impacting the other components of the SoC. Note that the firmware running on the targeted microcontroller is configured to allow the microcontroller to save and then restore its state after the reboot.

At stage 230, the security entity coordinates the installation of the firmware update to the targeted microcontroller's firmware without any cycle stealing from the host (e.g., the OS of the SoC). That is, the security entity does not use any processing cycles for the installation of the firmware update that would otherwise be used by, or allocated to, the host software and/or the processing core(s) 102. This enables the update to be performed without a customer-observable performance degradation during the update. In contrast, conventional firmware updates normally steal processing cycles from the host OS and result in customer-observable performance degradation. This stage can be performed within a few microseconds.

At stage 235, any system management states after the reset of the targeted microcontroller are saved (as they occur) and restored to the microcontroller. These are also the system management updates that occur after the offloading in stage 220. These system management states may be saved to the shared memory 150 on the SoC 100.

At stage 240, the update status (or error status) of the targeted microcontroller is provided to both the host software (e.g., the OS of the SoC) and the platform of the SoC (e.g., the BMC).

At stage 245, in case of a failure, a rollback to the original/previous microcontroller firmware is performed, and the microcontroller is restored to, and continues operating from, the original/previous system state. Example failures include corrupted files, power failures, unexpected interrupts, and the like. Alternatively, there may be an attacker entity that has attempted to modify the firmware update or attempted to load an older firmware version that has a known security vulnerability. A rollback, if needed, may access system management states saved to the shared memory 150 on the SoC at stage 235. Stage 245 is optional (as indicated by the dashed lines) because it is only performed in the event of an error.

At stage 250, a targeted update to boot storage is performed to ensure that successive boot ups of the target microcontroller (and the other components of the SoC) will boot with the updated firmware. This may include authenticating both boot and updated certificates. The boot storage may be an off-SoC memory (e.g., Flash memory, electrically erasable programmable ROM (EEPROM)).

Note that in the flow 200, not all stages need to be performed in the illustrated order. Rather, as will be appreciated, the order of certain stages may be reversed (e.g., stages 210 and 215) and certain stages may be performed simultaneously (e.g., stages 210 and 215).

The flow 200 is designed to update the firmware of a target microcontroller transparently to high-level software (e.g., the OS). However, the present techniques can be extended to updates that involved "enlightened" entities (i.e., entities that are aware of the firmware update flows). For example, there may be interfaces and/or facilities to enable high-level software ("enlightened" software) to interact with the low-impact firmware update flows. In this case, the enlightened high-level software may interact with a firmware update flow by quiescing direct memory access (DMA) and other operations. As another example, there may be interfaces and/or facilities to enable platform components (e.g., the BMC) to interact with the low-impact firmware update flows. In this case, the enlightened platform component may interact with a firmware update flow by reducing platform power via power limiting techniques and pausing certain functions/operations during the update.

Figure 3:
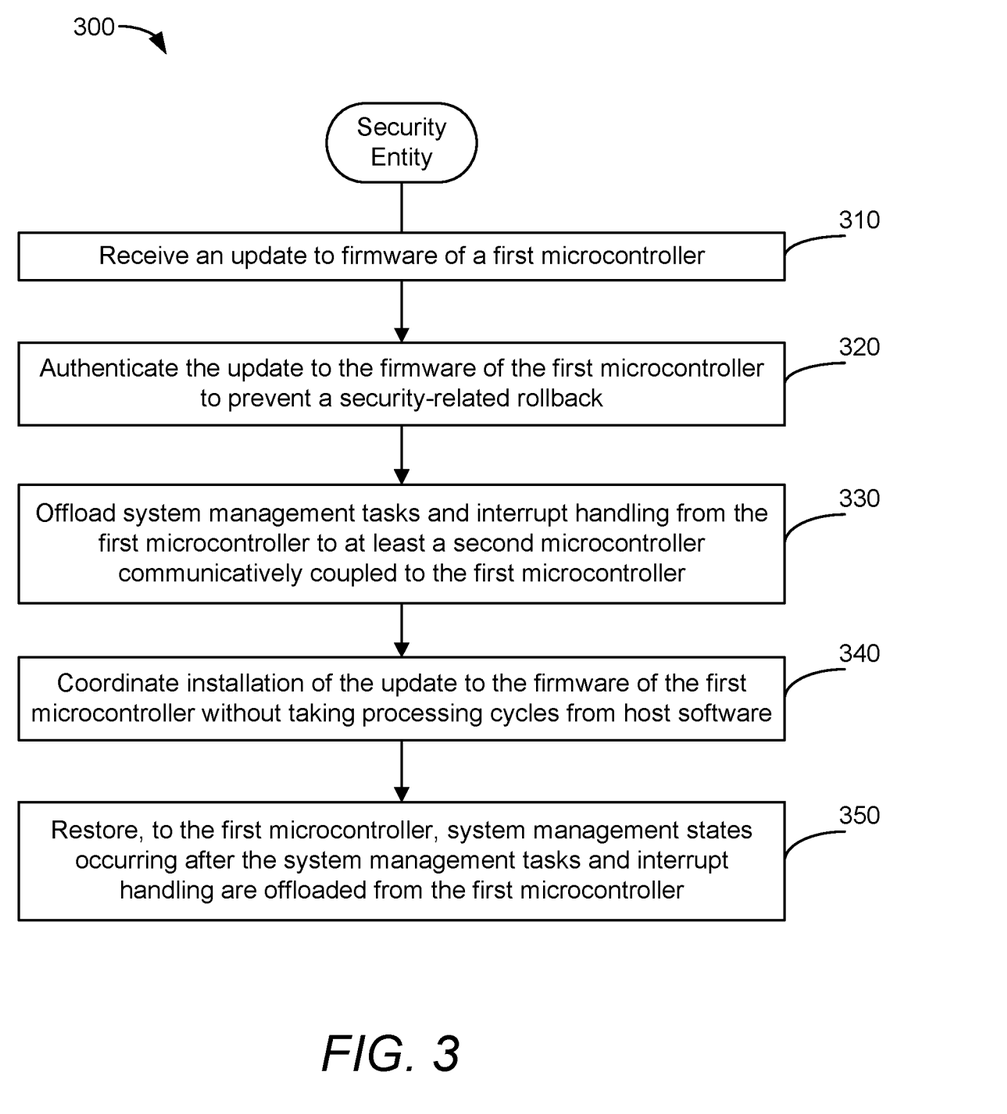
FIG. 3 illustrates an example method for performing a low-impact firmware update to a first microcontroller on an SoC, according to aspects of the disclosure.

FIG. 3 illustrates an example method 300 for performing a low-impact firmware update to a first microcontroller (e.g., MPro 110), according to aspects of the disclosure. In an aspect, the first microcontroller may be a component of a SoC (e.g., SoC 100) and the method 300 may be performed by a security entity communicatively coupled to the first microcontroller (e.g., SecPro 120).

At 310, the security entity receives an update to firmware of the first microcontroller, as at stage 205 of FIG. 2.

At stage 320, the security entity authenticates the update to the firmware of the first microcontroller to prevent a security-related rollback, as at stage 210 of FIG. 2.

At 330, the security entity offloads system management tasks and interrupt handling from the first microcontroller to at least a second microcontroller communicatively coupled to the first microcontroller, as at stage 220 of FIG. 2.

At stage 340, the security entity coordinates installation of the update to the firmware of the first microcontroller without taking processing cycles from host software (e.g., of the SoC 100), as at stage 230 of FIG. 2.

At stage 350, the security entity restores, to the first microcontroller, system management states occurring after the system management tasks and interrupt handling are offloaded from the first microcontroller, as at stage 235 of FIG. 2.

Figure 4:
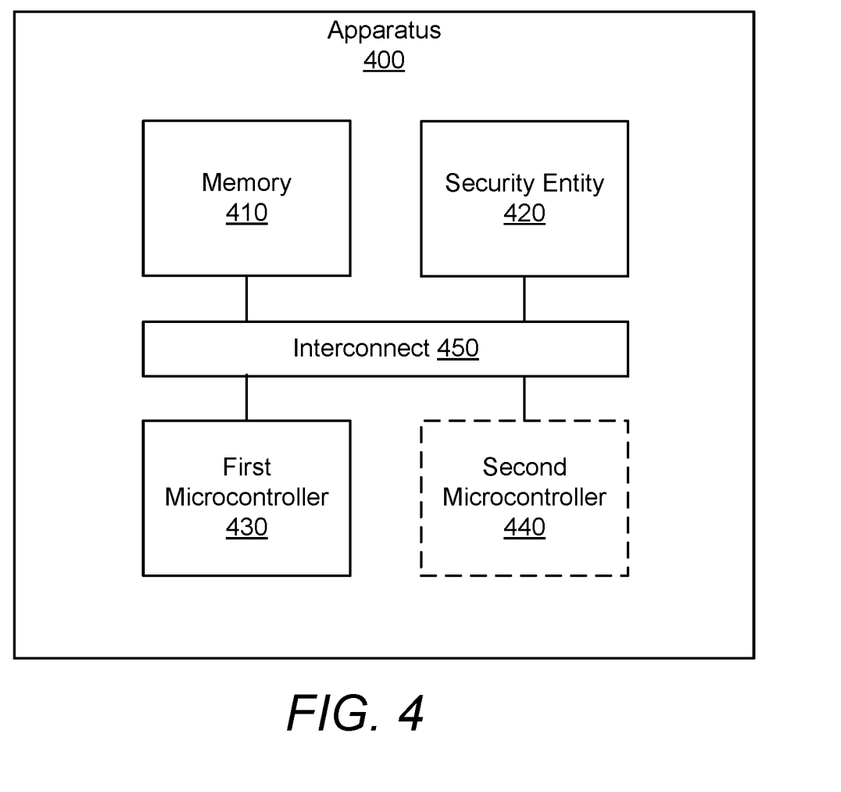
FIG. 4 illustrates an example apparatus, according to aspects of the disclosure.

FIG. 4 illustrates an example apparatus 400, according to aspects of the disclosure. In an aspect, the apparatus 400 may be an SoC, such as SoC 100. The apparatus 400 includes a memory 410, a security entity 420, a first microcontroller 430, and an optional second microcontroller 440 communicatively coupled to each other via an interconnect 450. In an aspect, the memory 410 may correspond to memory 150, the security entity 420 may correspond to the SecPro 120, the first microcontroller 430 may correspond to the MPro 110, and the interconnect 450 may correspond to the mesh interconnect 106. The second microcontroller 440 is optional because it may correspond to the security entity 420 (e.g., the SecPro 120) or another microcontroller.

In an aspect, the security entity 420 may be configured to receive an update to firmware of the first microcontroller 430, authenticate the update to the firmware of the first microcontroller 430 to prevent a security-related rollback, offload system management tasks and interrupt handling from the first microcontroller 430 to at least the second microcontroller 440 (which may be the security entity 420 or another microcontroller), coordinate installation of the update to the firmware of the first microcontroller 420 without taking processing cycles from host software of the apparatus 400 (e.g., the OS), and restore, to the first microcontroller 430, system management states occurring after the system management tasks and interrupt handling are offloaded from the first microcontroller 430.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a DSP, an ASIC, an FPGA, or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more example aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method of performing a low-impact firmware update to a first microcontroller, comprising:
receiving, at a security entity communicatively coupled to the first microcontroller, an update to firmware of the first microcontroller;
authenticating, by the security entity, the update to the firmware of the first microcontroller to prevent a security-related rollback;
offloading, by the security entity, system management tasks and interrupt handling from the first microcontroller to at least a second microcontroller communicatively coupled to the first microcontroller;
coordinating, by the security entity, installation of the update to the firmware of the first microcontroller without taking processing cycles from host software; and
restoring, to the first microcontroller by the security entity, system management states occurring after the system management tasks and interrupt handling are offloaded from the first microcontroller.

2. The method of claim 1, further comprising:
placing the first microcontroller into an isolated reset domain to enable reboot of the first microcontroller without impacting other components.

3. The method of claim 1, wherein:
the update to the firmware is received via in-band firmware update delivery, or
the update to the firmware is received via out-of-band firmware update delivery.

4. The method of claim 1, further comprising:
ensuring, by the security entity, that the update to the firmware of the first microcontroller is compatible with firmware of other components.

5. The method of claim 1, further comprising:
storing the system management states to a memory associated with the first microcontroller.

6. The method of claim 1, further comprising:
reporting, by the security entity, a status of the installation of the update to the firmware of the first microcontroller to the host software, a baseboard management controller (BMC), or both.

7. The method of claim 1, further comprising:
performing a rollback to a previous version of the firmware of the first microcontroller based on a failure of the installation of the update to the firmware of the first microcontroller; and
restoring the first microcontroller to a previous state of the system management states based on the failure of the installation of the update to the firmware of the first microcontroller.

8. The method of claim 1, further comprising:
performing a targeted update to a boot storage associated with the first microcontroller to ensure that subsequent boot ups of the first microcontroller use the update to the firmware of the first microcontroller.

9. The method of claim 1, wherein the security entity is the second microcontroller.

10. An apparatus, comprising:
a memory;
a first microcontroller; and
a security entity communicatively coupled to the first microcontroller, wherein the security entity is configured to:
receive an update to firmware of the first microcontroller;
authenticate the update to the firmware of the first microcontroller to prevent a security-related rollback;
offload system management tasks and interrupt handling from the first microcontroller to at least a second microcontroller communicatively coupled to the first microcontroller;
coordinate installation of the update to the firmware of the first microcontroller without taking processing cycles from host software of the apparatus; and
restore, to the first microcontroller, system management states occurring after the system management tasks and interrupt handling are offloaded from the first microcontroller.

11. The apparatus of claim 10, wherein the security entity is further configured to:
place the first microcontroller into an isolated reset domain to enable reboot of the first microcontroller without impacting other components of the apparatus.

12. The apparatus of claim 10, wherein the security entity is further configured to:
ensure that the update to the firmware of the first microcontroller is compatible with firmware of other components of the apparatus.

13. The apparatus of claim 10, wherein the security entity is further configured to:
store the system management states to the memory of the apparatus.

14. The apparatus of claim 10, wherein the security entity is further configured to:
report a status of the installation of the update to the firmware of the first microcontroller to the host software of the apparatus, a platform of the apparatus, or both.

15. The apparatus of claim 10, wherein the security entity is further configured to:
perform a rollback to a previous version of the firmware of the first microcontroller based on a failure of the installation of the update to the firmware of the first microcontroller; and
restore the first microcontroller to a previous state of the system management states based on the failure of the installation of the update to the firmware of the first microcontroller.

16. The apparatus of claim 10, wherein the security entity is further configured to:
perform a targeted update to a boot storage associated with the apparatus to ensure that subsequent boot ups of the first microcontroller use the update to the firmware of the first microcontroller.

17. The apparatus of claim 10, wherein the security entity is the second microcontroller.

18. An apparatus, comprising:
means for receiving an update to firmware of a first microcontroller;
means for authenticating the update to the firmware of the first microcontroller to prevent a security-related rollback;
means for offloading system management tasks and interrupt handling from the first microcontroller to at least a second microcontroller on the apparatus;
means for coordinating installation of the update to the firmware of the first microcontroller without taking processing cycles from host software of the apparatus; and means for restoring, to the first microcontroller, system management states occurring after the system management tasks and interrupt handling are offloaded from the first microcontroller.

19. The apparatus of claim 18, further comprising:
means for placing the first microcontroller into an isolated reset domain to enable reboot of the first microcontroller without impacting other components of the apparatus.

20. The apparatus of claim 18, wherein the apparatus is the second microcontroller.

* * * * *